US012046407B2

(12) United States Patent
Kim et al.

(10) Patent No.: US 12,046,407 B2
(45) Date of Patent: Jul. 23, 2024

(54) COIL COMPONENT AND METHOD FOR MANUFACTURING THE SAME

(71) Applicant: SAMSUNG ELECTRO-MECHANICS CO., LTD., Suwon-si (KR)

(72) Inventors: Jae Hun Kim, Suwon-si (KR); Young Ku Lyu, Suwon-si (KR); Boum Seock Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 10 days.

(21) Appl. No.: 17/752,393

(22) Filed: May 24, 2022

(65) Prior Publication Data

US 2022/0285084 A1 Sep. 8, 2022

Related U.S. Application Data

(63) Continuation of application No. 16/365,081, filed on Mar. 26, 2019, now abandoned, which is a (Continued)

(30) Foreign Application Priority Data

Dec. 18, 2015 (KR) ........................ 10-2015-0181747

(51) Int. Cl.
*H01F 27/32* (2006.01)
*H01F 17/00* (2006.01)
(Continued)

(52) U.S. Cl.
CPC ..... *H01F 27/2804* (2013.01); *H01F 17/0013* (2013.01); *H01F 17/04* (2013.01); (Continued)

(58) Field of Classification Search
CPC .. H01F 27/2804; H01F 17/0013; H01F 17/04; H01F 27/292; H01F 27/324; H01F 2017/048
See application file for complete search history.

(56) References Cited

U.S. PATENT DOCUMENTS 6,008,102 A 12/1999 Alford et al.
6,030,877 A 2/2000 Lee et al.
(Continued)

FOREIGN PATENT DOCUMENTS

JP H09-252087 A 9/1997
JP 2006-135056 A 5/2006
(Continued)

OTHER PUBLICATIONS

Office Action issued in corresponding Korean Patent Application No. 10-2015-0181747 on Feb. 2, 2017, with X English translation.
(Continued)

*Primary Examiner* — Mang Tin Bik Lian
(74) *Attorney, Agent, or Firm* — Morgan, Lewis & Bockius LLP

(57) ABSTRACT

A coil component includes a body part including a magnetic material; a coil part disposed in the body part; and an electrode part disposed on the body part, wherein the coil part includes a supporting member, a coil conductor disposed on at least one surface of the supporting member and having a conductor pattern of a planar coil shape, and an insulator filling a space between the conductor patterns and covering an outer surface of the conductor pattern, and the conductor pattern has an aspect ratio ($H_1/W_1$), which is a ratio of a height $H_1$ to a width $W_1$, of 3 to 9, and a method of manufacturing the same.

15 Claims, 11 Drawing Sheets

I-I'

Related U.S. Application Data continuation of application No. 15/228,511, filed on Aug. 4, 2016, now Pat. No. 10,276,294.

(51) Int. Cl.

| | |
|---|---|
| ***H01F 17/04*** | (2006.01) |
| ***H01F 27/28*** | (2006.01) |
| ***H01F 27/29*** | (2006.01) |
| ***H01F 41/04*** | (2006.01) |

(52) U.S. Cl.

CPC ......... *H01F 27/292* (2013.01); *H01F 27/324* (2013.01); *H01F 41/041* (2013.01); *H01F 2017/048* (2013.01)

(56) References Cited

U.S. PATENT DOCUMENTS

| | | | | |
|---|---|---|---|---|
| 6,436,816 | B1 | 8/2002 | Lee et al. | |
| 9,595,384 | B2 | 3/2017 | Nakamura et al. | |
| 9,978,501 | B2 | 5/2018 | Jeong | |
| 2004/0056749 | A1 | 3/2004 | Kahlmann et al. | |
| 2004/0164835 | A1 | 8/2004 | Shoji | |
| 2006/0097820 | A1 | 5/2006 | Watanabe et al. | |
| 2012/0126926 | A1* | 5/2012 | Kroener | H01F 27/2804 336/199 |
| 2013/0249664 | A1 | 9/2013 | Tonoyama et al. | |
| 2013/0293337 | A1* | 11/2013 | Lo | H01F 41/041 336/200 |
| 2014/0167897 | A1 | 6/2014 | Choi et al. | |
| 2014/0247101 | A1* | 9/2014 | Cha | H01F 41/12 336/198 |
| 2014/0285305 | A1* | 9/2014 | Yoo | H01F 27/255 336/200 |
| 2015/0035634 | A1* | 2/2015 | Nakamura | H01F 41/046 336/170 |
| 2015/0035640 | A1 | 2/2015 | Wang et al. | |
| 2015/0255206 | A1 | 9/2015 | Han et al. | |
| 2016/0155556 | A1* | 6/2016 | Ohkubo | H01F 41/046 336/83 |
| 2016/0351316 | A1* | 12/2016 | Ohkubo | H01F 27/325 |
| 2018/0054900 | A1 | 2/2018 | Jeda et al. | |

FOREIGN PATENT DOCUMENTS

| | | | |
|---|---|---|---|
| JP | 2015-032625 | A | 2/2015 |
| KR | 10-2005-0045416 | A | 5/2005 |
| KR | 10-2015-0071266 | A | 6/2015 |

OTHER PUBLICATIONS

Office Action issued in corresponding Korean Patent Application No. 10-2017-0139112, dated Nov. 17, 2020 (with English Translation).

* cited by examiner

I-I`

COIL COMPONENT AND METHOD FOR MANUFACTURING THE SAME

CROSS-REFERENCE TO RELATED APPLICATION

This application is the continuation application of U.S. patent application Ser. No. 16/365,081 filed on Mar. 26, 2019, which is a Continuation application of U.S. patent application Ser. No. 15/228,511 filed on Aug. 4, 2016, now U.S. Pat. No. 10,276,294, which claims the benefit of priority to Korean Patent Application No. 10-2015-0181747 filed on Dec. 18, 2015 with the Korean Intellectual Property Office, the entirety of both are incorporated herein by reference.

BACKGROUND

The present disclosure relates to a coil component and a method of manufacturing the same.

In accordance with the miniaturization and slimming of electronic devices such as digital TVs, mobile phones, laptop PCs, and the like, demand has increased for coil components used for such electronic devices that are likewise miniaturized and slimmed. Research and development has actively been performed to develop a winding type or thin film type coil component of various forms that exhibits such miniaturization and slimming.

One issue that arises with the miniaturization and slimming of the coil component is to implement characteristics which are equal to existing characteristics in spite of the miniaturization and slimming of the coil component. In order to implement desired characteristics, it is necessary to secure low direct current resistance $R_{dc}$ and a size of a core in which a magnetic material is provided. To this end, an anisotropic plating technology may be used when manufacturing a product to incorporate technology capable of increasing an aspect ratio of a pattern and a cross-sectional area of a coil.

When the miniaturized and slimmed coil component is manufactured using anisotropic plating technology in a limited space, however, there are increased risks of defects such as a deterioration in uniformity of plating growth or an occurrence of short circuits between the coils due to the increase in the aspect ratio.

SUMMARY

An aspect of the present disclosure provides a coil component having a novel structure capable of securing uniformity of a coil and low direct current resistance $R_{dc}$ while having low risk of defects such as an occurrence of short circuits, or the like.

According to an aspect of the present disclosure, a coil conductor is formed using an insulator which is selectively removable and has an opening pattern having a high aspect ratio formed therein.

BRIEF DESCRIPTION OF DRAWINGS

The above and other aspects, features, and advantages of the present disclosure will be more clearly understood from the following detailed description taken in conjunction with the accompanying drawings.

DETAILED DESCRIPTION

Figure 1:
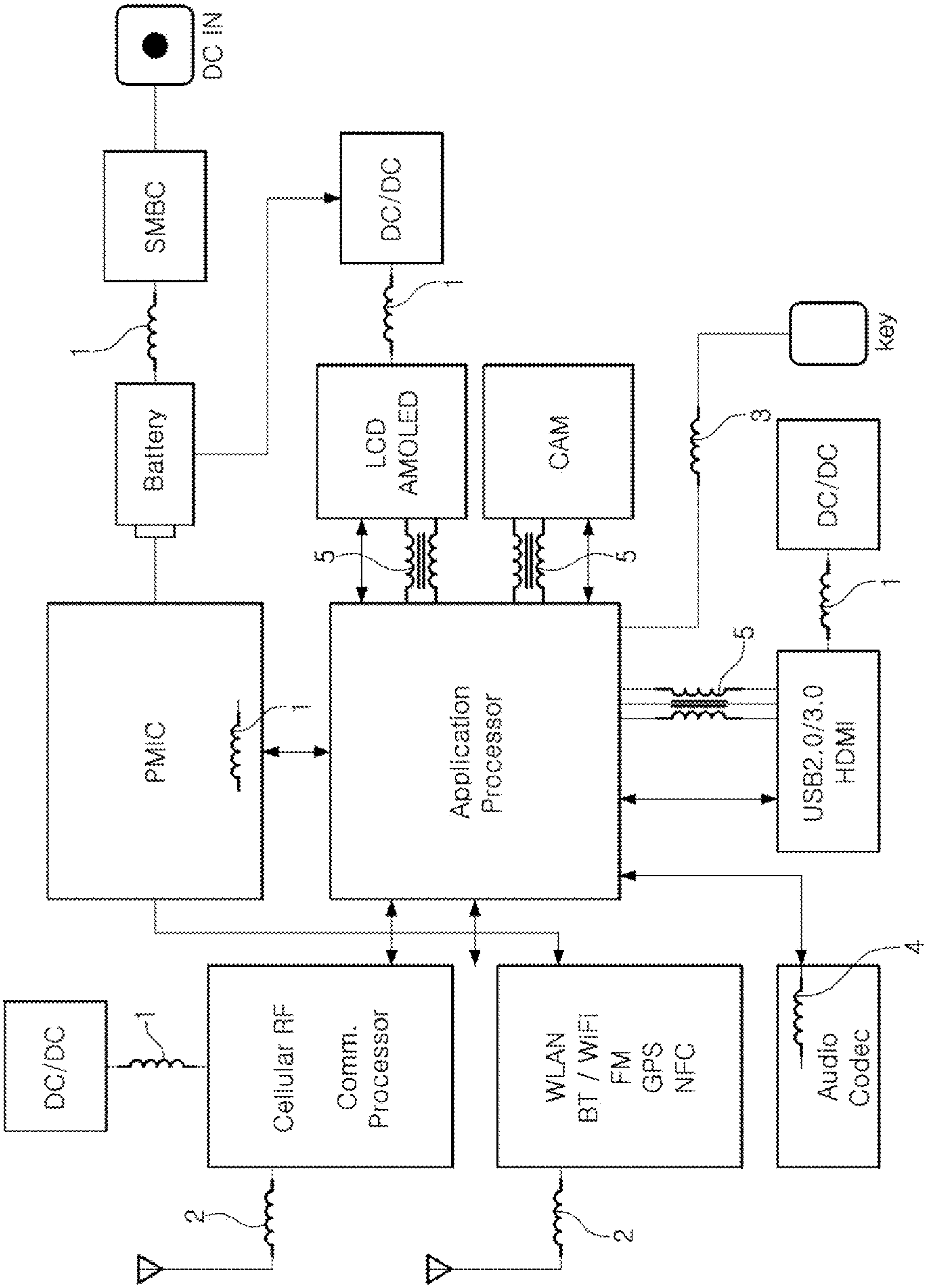
FIG. 1 schematically illustrates an exemplary embodiment of a coil component used in an electronic device.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Electronic Device

FIG. 1 schematically illustrates an exemplary embodiment of a coil component used in an electronic device. Referring to FIG. 1, it may be seen that various kinds of electronic components may be used in the electronic device. For example, around an application processor, DC/DC, Comm. Processor, WLAN BT/WiFi FM GPS NFC, PMIC, Battery, SMBC, LCD AMOLED, Audio Codec, USB 2.0/3.0 HDMI, CAM, and the like may be used. Here, various kinds of coil components for the purpose of removing noise, and the like, may be appropriately used according to the use thereof among the electronic components. For example, a power inductor 1, a high frequency (HF) inductor 2, a general bead 3, a bead for high frequency (GHz bead) 4, a common mode filter 5, and the like may be used.

Specifically, the power inductor 1 may be used to store electricity in a magnetic field form to maintain an output voltage and stabilize power. Further, the high frequency (HF) inductor 2 may be used to match impedances to secure a required frequency, or interrupt noise and an alternating current component. Further, the general bead 3 may be used to remove noises in power and signal lines, or to remove a high frequency ripple. Further, the bead for high frequency (GHz band) 4 may be used to remove high frequency noises in a power line and a signal line related to audio. Further, the common mode filter 5 may be used to pass a current and remove only common mode noise in a differential mode.

The electronic device may representatively be a smartphone, but is not limited thereto. For example, the electronic device may also be a personal digital assistant, a digital video camera, a digital still camera, a network system, a computer, a monitor, a television, a video game console, and a smart watch. Besides, the electronic device may also be other various electronic devices which are well known to those skilled in the art.

Coil Component

Hereinafter, a coil component according to the present disclosure will be described, and in particular, a structure of an inductor will be described for convenience by way of example. However, the coil component according to the present disclosure may also be used in other various uses of coil components as described above. Meanwhile, a top surface used below refers to any surface of any target component disposed in a direction which is apart from a supporting member in a third direction for convenience, and a bottom surface refers to any surface of any target component disposed in a direction which is directed to the supporting member in the third direction for convenience. Further, a side surface refers to any surface of a target component disposed in any direction of a first direction or a second direction for convenience. However, these directions have been defined for convenience of explanation, and the scope of the present disclosure is not particularly limited by the directions defined as described above.

Figure 2:
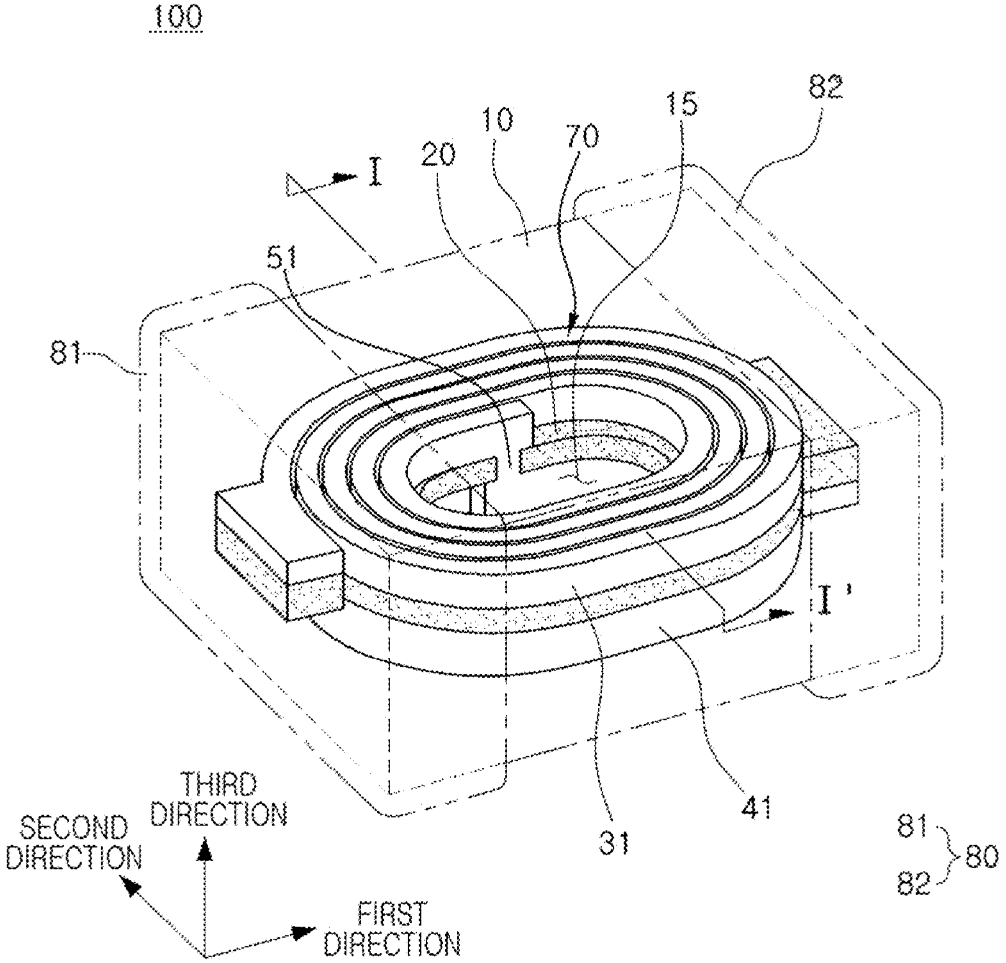
FIG. 2 is a schematic perspective view illustrating an exemplary embodiment of a coil component.

FIG. 2 is a schematic perspective view illustrating an exemplary embodiment of a coil component. Referring to FIG. 2, a coil component 100 according to an exemplary embodiment may include a body part 10, a coil part 70 disposed in the body part 10, and an electrode part 80 disposed on the body part 10. The coil part 70 may include a supporting member 20, a first coil conductor 31 and a second coil conductor 41 disposed on first and second surfaces of the supporting member 20, respectively, and a through via 51 penetrating through the supporting member 20 and connecting the first coil conductor 31 and the second coil conductor 41 to each other. The electrode part 80 may include a first electrode 81 and a second electrode 82 disposed on the body part 10 to be spaced apart from each other.

The body part 10 may form a body of the coil component 100, and may include a first surface and a second surface opposing each other in a first direction of the body part 10, a third surface and fourth surface opposing each other in a second direction thereof, and a fifth surface and a sixth surface opposing each other in a third direction thereof. The body part 10 may have a hexahedral shape as described above, but is not limited thereto. The body part 10 may include a magnetic material exhibiting magnetic characteristics. For example, the body part 10 may be formed by providing a ferrite or a magnetic metallic particle in a resin. The ferrite may be formed of, for example, a material such as a Mn—Zn based ferrite, a Ni—Zn based ferrite, a Ni—Zn—Cu based ferrite, a Mn—Mg based ferrite, a Ba based ferrite, a Li based ferrite, or the like. The magnetic metallic particle may include any one or more selected from the group consisting of iron (Fe), silicon (Si), chromium (Cr), aluminum (Al), and nickel (Ni). For example, the metallic magnetic particle may be, for example, an Fe—Si—B—Cr based amorphous metal, but is not limited thereto. A diameter of the metallic magnetic particle may be about 0.1 μm to 30 μm. The body part 10 may have a form in which the ferrite or the magnetic metallic particle is dispersed in a thermosetting resin such as an epoxy resin, a polyimide resin, or the like.

The magnetic material of the body part 10 may be formed of a magnetic resin composite in which a magnetic metallic powder and a resin mixture are mixed with each other. The magnetic metallic powder may include iron (Fe), chromium (Cr), or silicon (Si) as a main component, and may include, for example, iron (Fe)-nickel (Ni), iron (Fe), iron (Fe)-chromium (Cr)-silicon (Si), and the like, but is not limited thereto. The resin mixture may include epoxy, polyimide, and liquid crystal polymer (LCP), and the like, but is not limited thereto. The magnetic metallic powder may also be formed by providing two or more magnetic metallic powders having an average particle diameter. In this case, the magnetic resin composite may be fully provided by performing a compression using bimodal magnetic metallic powders having different sizes, thereby increasing a filling rate.

The coil part 70 may serve to perform various functions in the electronic device using characteristics revealed from a coil of the coil component 100. For example, the coil component 100 may be a power inductor. In this case, the coil may serve to store electricity in a magnetic field form to maintain an output voltage and stabilize power. The first and second coil conductors 31 and 41 disposed on both surfaces of the supporting member 20, respectively, may be electrically connected to each other through the through via 51 penetrating through the supporting member 20. As a result, the first and second coil conductors 31 and 41 may be electrically connected to each other, thereby forming a single coil. A through hole 15 may be formed in a central portion of the coil part 70, and may be filled with the magnetic material forming the body part 10. A detailed description of the coil part 70 will be described below.

The electrode part 80 may serve to electrically connect the coil component 100 to the electronic device when the coil component 100 is mounted on the electronic device. The electrode part 80 may include the first electrode 81 and the second electrode 82 disposed on the body part 10 to be spaced apart from each other. The first electrode 81 may cover the first surface of the body part 10, and may be partially extended to the third, fourth, fifth, and sixth surfaces thereof. The first electrode 81 may be connected to a terminal of the first coil conductor 31 which is led to the first surface of the body part 10. The second electrode 82 may cover the second surface of the body part 10, and may be partially extended to the third, fourth, fifth, and sixth surfaces thereof. The second electrode 82 may be connected to a terminal of the second coil conductor 41 which is led to the second surface of the body part 10. However, the electrodes 81 and 82 may be disposed in a form different from that described above. The electrodes may each include, for example, a conductive resin layer, and a conductor layer formed on the conductive resin layer. The conductive resin layer may be formed by a paste printing, or the like, and may include any one or more conductive metals selected from the group consisting of copper (Cu), nickel (Ni), and silver (Ag), and a thermosetting resin. The conductor layer may include any one or more selected from the group consisting of the nickel (Ni), copper (Cu), and tin (Sn), and for example, a nickel (Ni) layer and a tin (Sn) layer may be sequentially formed by plating.

As needed, the electrode part 80 may include a pre-plating layer (not illustrated) to improve electrical reliability between the coil part 70 and the electrode part 80. The pre-plating layer (not illustrated) may include a first pre-plating layer (not illustrated) disposed on a terminal of the first coil conductor 31 to connect the first coil conductor to the first electrode 81, and a second pre-plating layer (not illustrated) disposed on a terminal of the second coil conductor 41 to connect the second coil conductor to the second electrode 82. The pre-plating layers may be formed of a conductive material, such as copper (Cu). The electrodes 81 and 82 may be formed by applying at least one of nickel (Ni) and tin (Sn) to the pre-plating layer (not illustrated), and the electrodes 81 and 82 may also be formed by applying at least one of nickel (Ni) and tin (Sn) to the pre-plating layer after applying at least one of silver (Ag) and copper (Cu) to the pre-plating layer. Therefore, contact force of the electrodes 81 and 82 may be increased, and silver (Ag), copper (Cu), and the like for forming the electrodes 81 and 82 need not to be separately applied.

Figure 3:
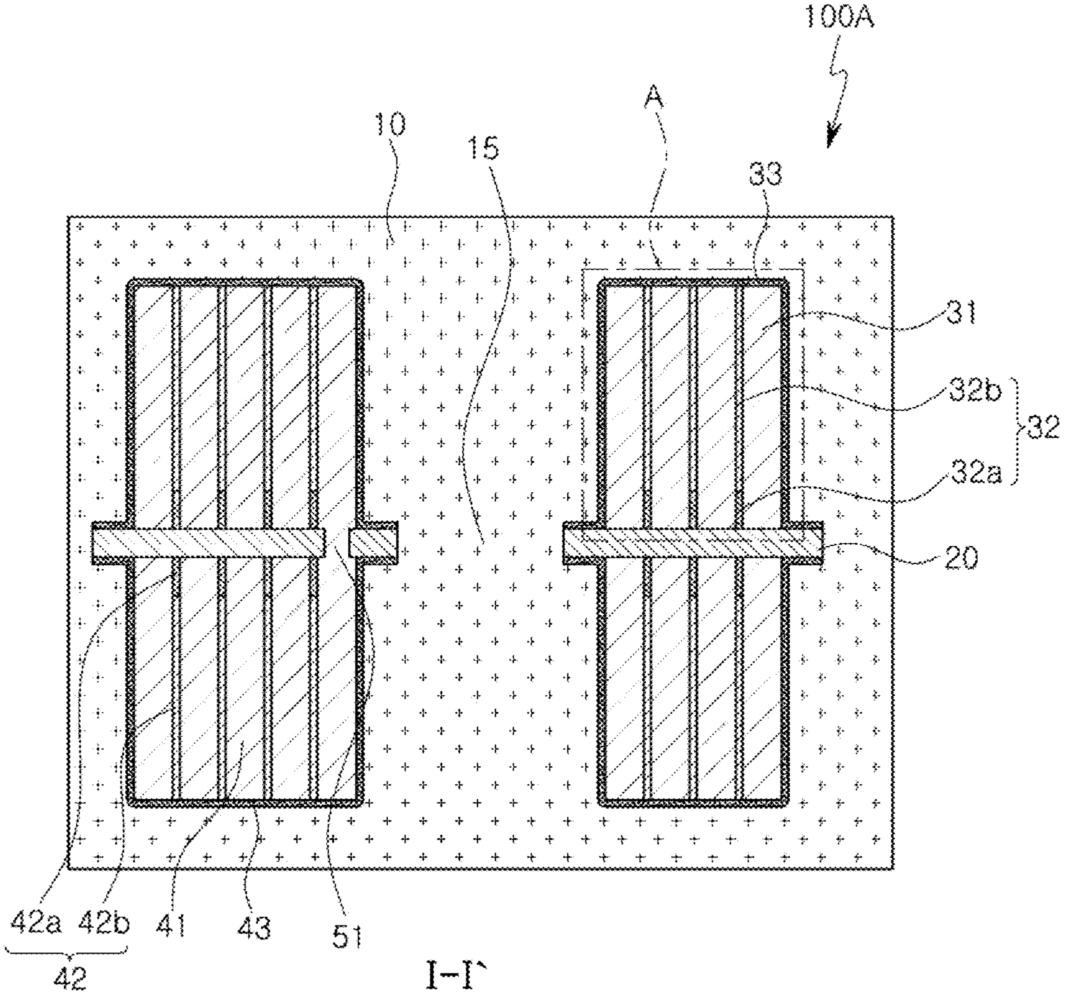
FIG. 3 illustrates a schematic cross-sectional view taken along line I-I' of the coil component of FIG. 2.
Figure 4:
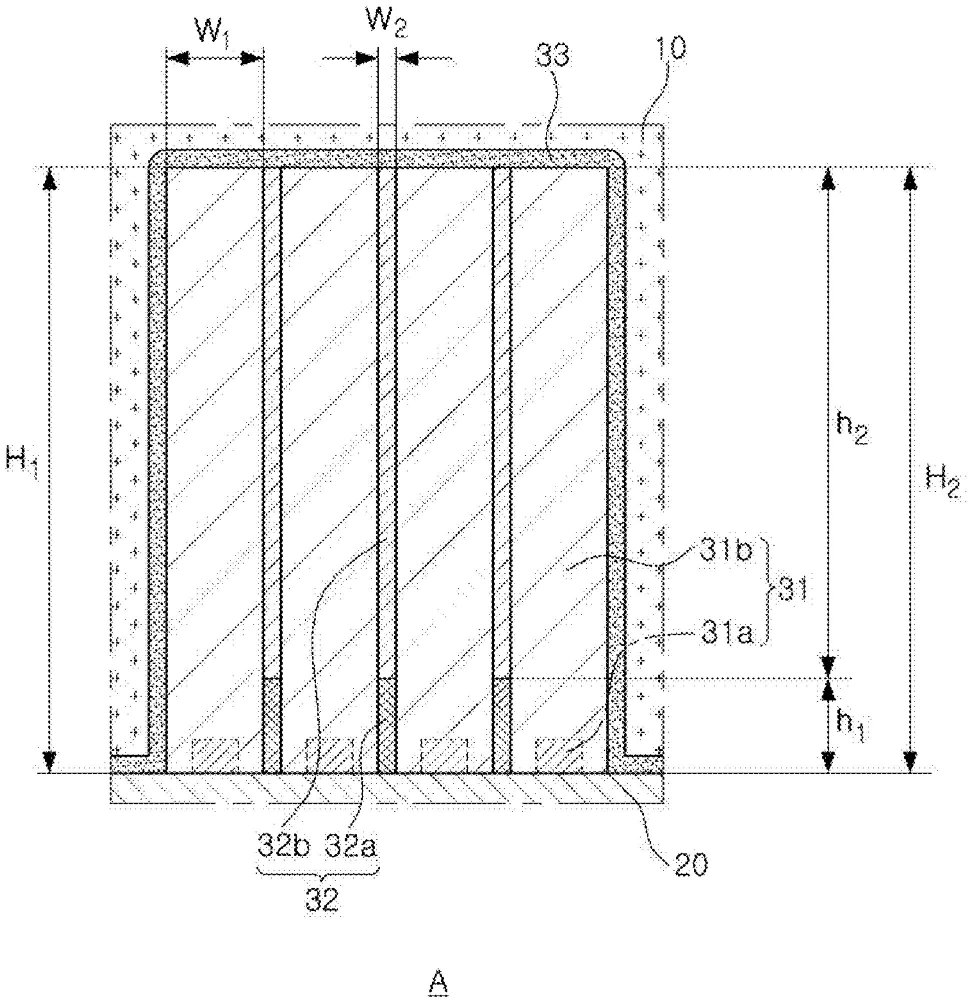
FIG. 4 is a schematic enlarged view of region A of the coil component of FIG. 3.

FIG. 3 illustrates a schematic cross-sectional view taken along line I-I' of the coil component of FIG. 2. FIG. 4 is a schematic enlarged view of region A of the coil component of FIG. 3. Referring to FIGS. 3 and 4, the coil part 70 may include the supporting member 20, the first coil conductor 31 disposed on a first surface of the supporting member 20 and having a first conductor pattern of a planar coil shape, the second coil conductor 41 disposed on a second surface of the supporting member 20 opposing the first surface thereof and having a second conductor pattern of a planar coil shape, first insulators 32 and 33 filling a space between the first conductor patterns and covering outer surfaces of the first conductor pattern, second insulators 42 and 43 filling a space between the second conductor patterns and covering outer surfaces of the second conductor pattern, and the through via 51 penetrating through the supporting member 20 and connecting the first and second coil conductors 31 and 41 to each other.

The supporting member 20, which is used to support the coil conductors 31 and 41, and also allows them to be thinner and more easily formed, may be an insulating substance formed of an insulating resin. Here, as the insulating resin, a thermosetting resin such as an epoxy resin, a thermoplastic resin such as polyimide, or a resin having a reinforcement material such as a glass fiber or an inorganic filler impregnated therein, such as a pre-preg, Ajinomoto build-up film (ABF), FR-4, a bismaleimide triazine (BT) resin, a photo imagable dielectric (PID) resin, or the like may be used. In a case in which the glass fiber is contained in the supporting member 20, a degree of hardness may be greater. In some cases, a polypropylene glycol (PPG) substrate, a ferrite substrate, or a soft magnetic metal substrate may also be used.

The first coil conductor 31 may have the first conductor pattern of the planar coil shape. The first conductor pattern may be a plating pattern formed by a typical plating method, but is not limited thereto. Since the first conductor pattern may have a number of turns of at least two or more, the first conductor pattern may be a thin type and may implement high inductance. The first conductor pattern may include a first seed layer **31*a* disposed on the first surface of the supporting member 20, and a first plating layer 31*b* formed on the first seed layer 31*a*. The first seed layer 31*a* may include a plurality of layers, and for example, the first seed layer 31*a* may include a first adhesive layer including one or more of titanium (Ti), titanium-tungsten (Ti—W), molybdenum (Mo), chromium (Cr), nickel (Ni), and nickel (Ni)-chromium (Cr), and a first base plating layer disposed on the first adhesive layer and including the same material as the first plating layer 31*b*, such as copper (Cu), but is not limited thereto. The first plating layer 31*b*** may include a conductive material, such as copper (Cu), aluminum (Al), silver (Ag), tin (Sn), gold (Au), nickel (Ni), lead (Pd), or alloys thereof, and may generally include copper (Cu), but is not limited thereto.

The first conductor pattern may have an aspect ratio ($H_1/W_1$), which is a ratio of a height $H_1$ to a width $W_1$, of about 3 to 9. Direct current resistance $R_{dc}$ property, which is one main property of the coil component, for example, the inductor, is decreased as a cross-sectional area of the coil is increased. In addition, inductance may be increased as a magnetic area in the body through which magnetic flux passes is increased. Therefore, in order to decrease the direct current resistance ($R_{dc}$) and improve the inductance at the same time, it is necessary to increase the cross-sectional area of the coil and increase the area of the magnetic region. In order to increase the cross-sectional area of the coil, there is a method for increasing a width of the conductor pattern and a method for increasing a thickness of the conductor pattern. However, if the width of the conductor pattern is simply increased, it is more likely that a short circuit may occur between the coil patterns. Further, a limit on the number of turns of the conductor pattern which may be implemented may occur, which causes the area occupied by the magnetic region to be decreased. As a result, efficiency may be deteriorated and a limit in implementing a high capacity product may occur. Conversely, if the conductor pattern having a high aspect ratio is implemented by increasing the thickness of the conductor pattern without increasing the width of the conductor pattern, the above-mentioned problems may be avoided. Further, according to the present disclosure, since an opening pattern is first formed in resist and is utilized as a plating growth guide as described below, a shape of the coil conductor may be easily adjusted. However, in a case in which the aspect ratio is excessively high, it may be difficult to implement the conductor pattern, and a volume of the magnetic material disposed on the first conductor pattern may be decreased, thereby adversely affecting the inductance.

The first insulators 32 and 33 may include a first insulating wall 32 filling the space between the first conductor patterns, and a first insulating film 33 covering an outer surface of the first conductor pattern. The first insulating wall 32 may include a first resist 32*a* and a second resist 32*b* including different materials. The first resist 32*a* may be disposed on the first surface of the supporting member, and the second resist 32*b* may be disposed on the first resist 32*a*. The first resist 32*a* may serve to adhere the second resist 32*b* to the supporting member 20 and to selectively remove the first insulating wall 32 at the same time. Accordingly, the first resist 32*a* may include a photosensitive insulating material (photo imagable dielectric (PID)) which may be stripped by a stripping liquid. For example, the first resist 32*a* may include a photosensitive material including a cyclic ketone compound and an ether compound having a hydroxyl group as a main component. Here, the cyclic ketone compound may be, for example, cyclopentanone, and the ether compound having the hydroxyl group may be, for example, polypropylene glycol monomethyl ether, or the like, but is not limited thereto. For example, any material may be used as long as the material may be easily stripped by the stripping liquid. The second resist 32*b* may serve as a substantial insulating wall. Accordingly, the second resist 32*b* may include a photosensitive insulating material of a permanent type. For example, the second resist 32*b* may include a photosensitive material including a bisphenol based epoxy resin as a main component. Here, the bisphenol based epoxy resin may be, for example, a bisphenol A novolak epoxy resin, a bisphenol A diglycidyl ether bisphenol A polymer resin, and the like, but is not limited thereto. For example, any material may be used as long as the material is a typical resist material of a permanent type. The first insulating film 33 may include an insulating material used for a typical insulating coating, for example, an epoxy resin, a polyimide resin, a liquid crystalline polymer resin, and the like, but is not limited thereto. The first insulating film 33 does not need to include a photosensitive insulating material. Accordingly, the first insulating film 33 may include an insulating material different from the first insulating wall 32.

The first insulating wall 32 may have an aspect ratio ($H_2/W_2$), which is a ratio of a height $H_2$ to a width $W_2$, of about 10 to 25. For example, the first insulating wall 32 may have the width $W_2$ of about 10 μm to 12 μm, and the height $H_2$ of about 220 μm to 250 μm. According to the present disclosure, the opening pattern may be first formed in the resist, and may be utilized as the plating growth guide for forming the coil conductor as described below. In this case, the resist means a resist forming the first insulating wall 32. Therefore, as the first insulating wall 32 has a high aspect ratio, the first conductor pattern may be formed to have a higher aspect ratio, and may be miniaturized. In a case in which a line width is increased, since an area into which the magnetic body and the coil may inserted in relation to a defined volume in the component is decreased, the inductance may be decreased and the direct current resistance may be increased. However, in a case in which the aspect ratio is excessively high, it may be difficult to implement the first conductor pattern, and a volume of the magnetic material disposed on the first conductor pattern may be decreased, thereby adversely affecting the inductance. Meanwhile, a height $h_2$ of the second resist 32*b* may be higher than a height $h_1$ of the first resist 32*a*. The reason is that the first resist 32*a* serves to selectively remove the first insulating wall 32 while the second resist 32*b* serves as an insulating wall that substantially insulates between the first conductor patterns.

The second coil conductor 41 may have the second conductor pattern of the planar coil shape. The second conductor pattern may be a plating pattern formed by a typical plating method, but is not limited thereto. Since the second conductor pattern may have a number of turns of at least two or more, the second conductor pattern may be a thin type and may implement high inductance. The second conductor pattern may include a second seed layer 41*a* disposed on the second surface of the supporting member 20, and a second plating layer 41*b* formed on the second seed layer 41*a*. The second seed layer 41*a* may include a plurality of layers, and for example, the first seed layer 31*a* may include a second adhesive layer including one or more of titanium (Ti), titanium-tungsten (Ti—W), molybdenum (Mo), chromium (Cr), nickel (Ni), and nickel (Ni)-chromium (Cr), and a second base plating layer disposed on the second adhesive layer and including the same material as the second plating layer 41*b*, for example, copper (Cu), but is not limited thereto. The second plating layer 41*b* may include a conductive material, for example, copper (Cu), aluminum (Al), silver (Ag), tin (Sn), gold (Au), nickel (Ni), lead (Pd), or alloys thereof, and may generally include copper (Cu), but is not limited thereto.

The second conductor pattern may have an aspect ratio ($H_1/W_1$), which is a ratio of a height $H_1$ to a width $W_1$, of about 3 to 9. Direct current resistance $R_{dc}$ property, which is one main property of the coil component, for example, the inductor, is decreased as a cross-section area of the coil is increased. In addition, inductance may be increased as a magnetic area in the body through which magnetic flux passes is increased. Therefore, in order to decrease the direct current resistance ($R_{dc}$) and improve the inductance at the same time, it is necessary to increase the cross-section area of the coil and increase the area of the magnetic region. In order to increase the cross-section area of the coil, there is a method for increasing a width of the conductor pattern and a method for increasing a thickness of the conductor pattern. However, in a case in which the width of the conductor pattern is simply increased, it is apprehended that a short circuit occurs between the coil patterns. Further, a limit on the number of turns of the conductor pattern which may be implemented may occur, which causes the area occupied by the magnetic region to be decreased. As a result, efficiency may be deteriorated and a limit in implementing a high capacity product may occur. Conversely, in a case in which the conductor pattern having a high aspect ratio is implemented by increasing the thickness of the conductor pattern without increasing the width of the conductor pattern, the above-mentioned problems may be solved. Further, according to the present disclosure, since an opening pattern is first formed in resist and is utilized as a plating growth guide as described below, a shape of the coil conductor may be easily adjusted. However, in a case in which the aspect ratio is excessively high, it may be difficult to implement the second conductor pattern, and a volume of the magnetic material disposed on the second conductor pattern may be decreased, thereby adversely affecting the inductance.

The second insulators 42 and 43 may include a second insulating wall 42 filling the space between the second conductor patterns, and a second insulating film 43 covering an outer surface of the second conductor pattern. The second insulating wall 42 may include a third resist 42*a* and a fourth resist 42*b* including different materials. The third resist 42*a* may be disposed on the second surface of the supporting member, and the fourth resist 42*b* may be disposed on the third resist 42*a*. The third resist 42*a* may serve to adhere the fourth resist 42*b* to the supporting member 20 and to selectively remove the second insulating wall 42 at the same time. Accordingly, the third resist 42*a* may include a photosensitive insulating material (photo imagable dielectric (PID)) which may be stripped by a stripping liquid. For example, the third resist 42*a* may include a photosensitive material including a cyclic ketone compound and an ether compound having a hydroxyl group as a main component. Here, the cyclic ketone compound may be, for example, cyclopentanone, and the ether compound having the hydroxyl group may be, for example, polypropylene glycol monomethyl ether, or the like, but is not limited thereto. For example, any material may be used as long as the material may be easily stripped by the stripping liquid. The fourth resist 42*b* may serve as a substantial insulating wall. Accordingly, the second resist 32*b* may include an insulating material of a permanent type. For example, the fourth resist 42*b* may include a photosensitive material including a bisphenol epoxy based resin as a main component. Here, the bisphenol based epoxy resin may be, for example, a bisphenol A novolak epoxy resin, a bisphenol A diglycidyl ether bisphenol A polymer resin, and the like, but is not limited thereto. For example, any material may be used as long as the material is a typical resist material of a permanent type. The second insulating film 43 may include an insulating material used for a typical insulating coating, for example, an epoxy resin, a polyimide resin, a liquid crystalline polymer resin, and the like, but is not limited thereto. The second insulating film 43 does not need to include a photosensitive insulating material. Accordingly, the second insulating film 43 may include an insulating material different from the second insulating wall 42.

The second insulating wall 42 may have an aspect ratio ($H_2/W_2$), which is a ratio of a height $H_2$ to a width $W_2$, of about 10 to 25. For example, the second insulating wall 42 may have the width $W_2$ of about 10 μm to 12 μm, and the height $H_2$ of about 220 μm to 250 μm. According to the present disclosure, the opening pattern may be first formed in the resist, and may be utilized as the plating growth guide for forming the coil conductor as described below. In this case, the resist means a resist forming the second insulating wall 42. Therefore, as the second insulating wall 42 has a high aspect ratio, the second conductor pattern may be formed to have a higher aspect ratio, and may be miniaturized. In a case in which a line width is increased, since an area into which the magnetic body and the coil may inserted in relation to a defined volume in the component is decreased, the inductance may be decreased and the direct current resistance may be increased. However, in a case in which the aspect ratio is excessively high, it may be difficult to implement the second conductor pattern, and a volume of the magnetic material disposed on the second conductor pattern may be decreased, thereby adversely affecting the inductance. Meanwhile, a height $h_2$ of the fourth resist 42*b* may be higher than a height $h_1$ of the third resist 42*a*. The reason is that the third resist 32*a* serves to selectively remove the second insulating wall 42 while the fourth resist 42*b* serves as an insulating wall that substantially insulates between the second conductor patterns.

The following Table 1 illustrates the direct current resistance $R_{dc}$ according to the aspect ratio of the conductor pattern. As seen from numerical values described in Table 1, it may be seen that as the aspect ratio of the conductor pattern is increased, the direct current resistance $R_{dc}$ is decreased. However, in a case in which the aspect ratio of the conductor pattern is excessively increased, since an area occupied by the magnetic body in a defined volume of the body becomes narrow, inductance Ls may be decreased to an allowable range or less. The coil component used for the experiment was 1005 size (L×W×T=1.08×0.66×0.78 mm), and is an inductor in which conductor patterns of a planar coil shape formed of copper were formed on both surfaces of a supporting member. The respective conductor patterns formed on both surfaces of the supporting member had about three line widths, and generally had a number of turns of about 5.5 times. Besides, other configurations were equally applied to all samples used for the experiment, and the details described in the present disclosure were applied intactly. Meanwhile, an indication "*" in Table 1 means a Comparative Example.

TABLE 1

| Sample | Number of Turns of Coil | Width ($W_1$) | Height ($H_1$) | Ur45_Ls | Ur60_Ls | $R_{dc}$ |
|---|---|---|---|---|---|---|
| 1* | 5.5 | 45 μm/35 μm/45 μm | 0.1 mm | 0.424 uH | 0.559 uH | 58.329 mΩ |
| 2 | 5.5 | 45 μm/35 μm/45 μm | 0.2 mm | 0.275 uH | 0.361 uH | 29.777 mΩ |
| 3 | 5.5 | 45 μm/35 μm/45 μm | 0.26 mm | 0.183 uH | 0.238 uH | 23.157 mΩ |
| 4* | 5.5 | 55 μm/45 μm/55 μm | 0.1 mm | 0.364 uH | 0.481 uH | 45.771 mΩ |
| 5 | 5.5 | 55 μm/45 μm/55 μm | 0.2 mm | 0.236 uH | 0.310 uH | 23.457 mΩ |
| 6 | 5.5 | 55 μm/45 μm/55 μm | 0.26 mm | 0.156 uH | 0.202 uH | 18.330 mΩ |
| 7* | 5.5 | 65 μm/55 μm/65 μm | 0.1 mm | 0.303 uH | 0.399 uH | 34.475 mΩ |
| 8 | 5.5 | 65 μm/55 μm/65 μm | 0.2 mm | 0.196 uH | 0.257 uH | 19.288 mΩ |

The through via 51 may electrically connect the first coil conductor 31 and the second coil conductor 41 to each other, thereby allowing a single coil rotated in the same direction to be formed. The through via 51 may be a plating pattern formed by typical plating after forming the through hole, but is not limited thereto. In some cases, the through via 51 may be formed simultaneously with the first coil conductor 31 and/or the second coil conductor 41. As a result, the through via 51 may be integrated with the first coil conductor 31 and/or the second coil conductor 41, but is not limited thereto. The through via 51 may also include a via seed layer 51*a* and a via plating layer 51*b*. The via seed layer 51*a* may include a plurality of layers, and for example, the first seed layer 31*a* may include a via adhesive layer including one or more of titanium (Ti), titanium-tungsten (Ti—W), molybdenum (Mo), chromium (Cr), nickel (Ni), and nickel (Ni)-chromium (Cr), and a via base plating layer disposed on the via adhesive layer and including the same material as the via plating layer 51*b*, for example, copper (Cu), but is not limited thereto. The via plating layer 51*b* may include a conductive material, such as copper (Cu), aluminum (Al), silver (Ag), tin (Sn), gold (Au), nickel (Ni), lead (Pd), or alloys thereof, and may generally include copper (Cu), but is not limited thereto. A horizontal cross-section shape of the through via 51 is not particularly limited, and may be, for example, a circular shape, an oval shape, a polygonal shape, and the like. A vertical cross-section shape of the through via 51 is also not particularly limited, and may be, for example, a tapered shape, a reverse-tapered shape, an hourglass shape, a pillar shape, and the like. As the supporting member 20, for example, a pre-preg including a glass fiber and an insulating resin may generally be used. In this case, a shape of the through via 51 may be an hourglass shape, but is not limited thereto.

Figure 5:
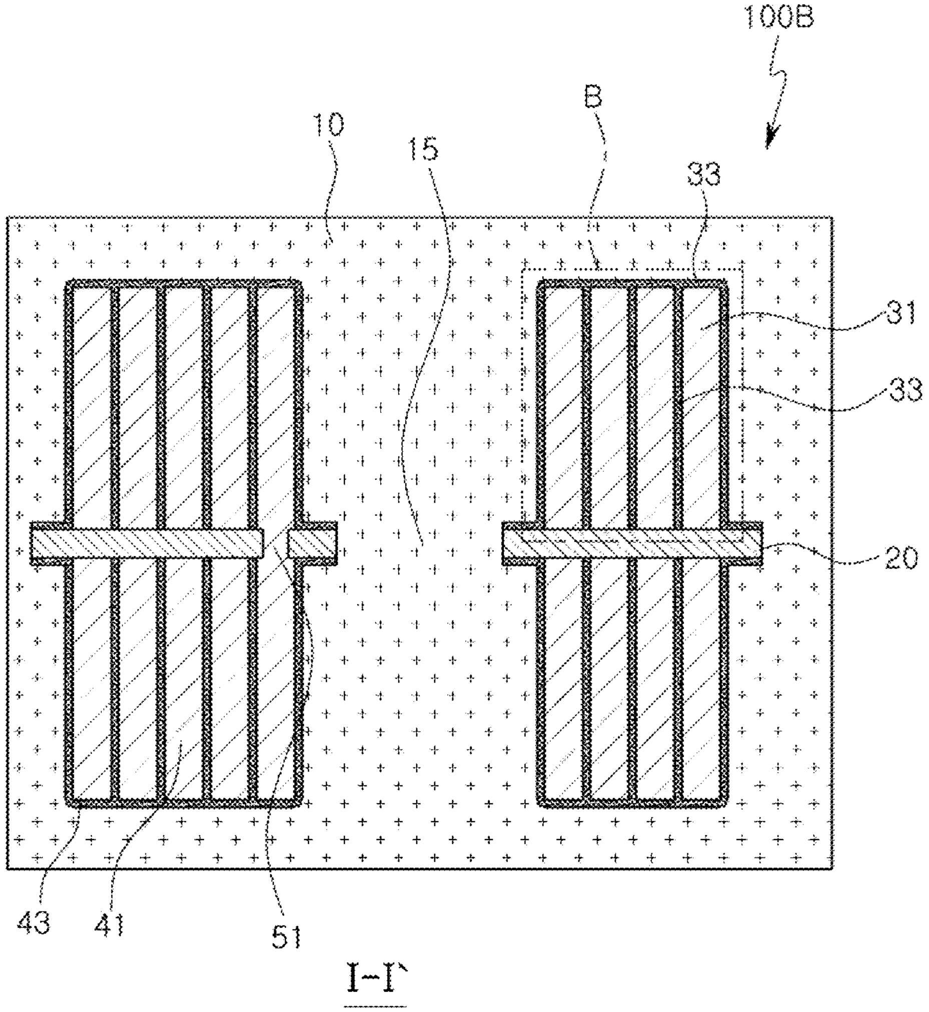
FIG. 5 illustrates a schematic cross-sectional view taken along line I-I' of FIG. 2 according to another exemplary embodiment of the coil component.
Figure 6:
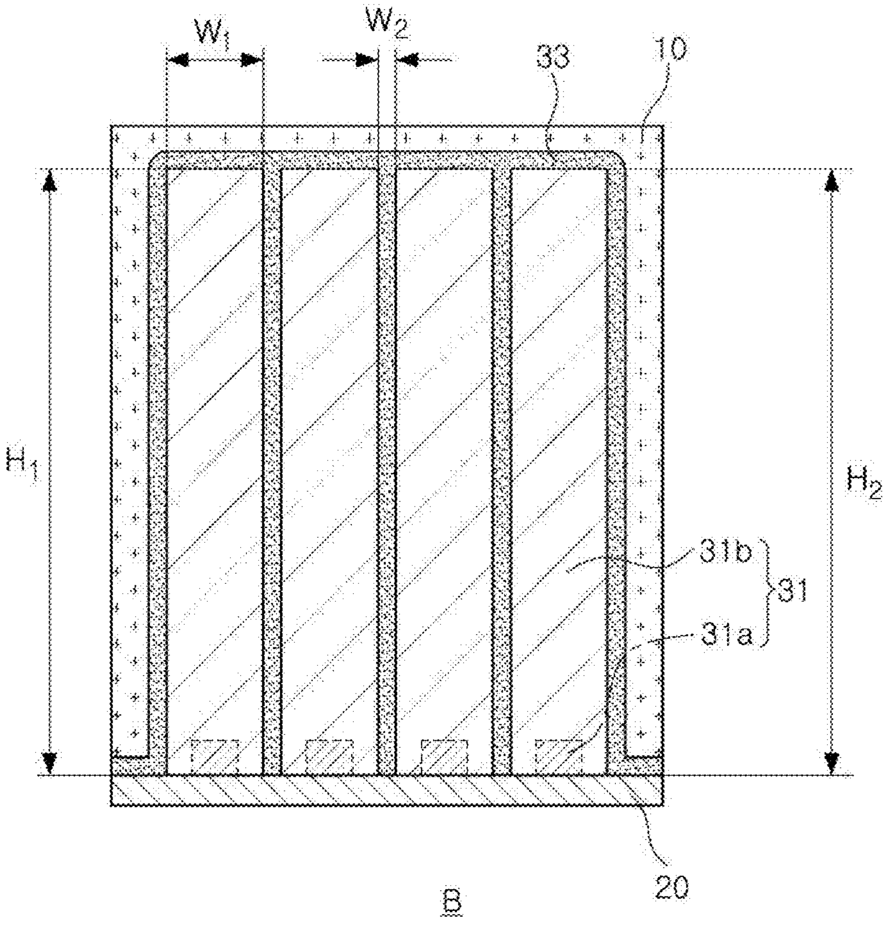
FIG. 6 is a schematic enlarged view of region B of the coil component of FIG. 5.

FIG. 5 illustrates another exemplary embodiment of a schematic cross-sectional view taken along line I-I' of the coil component of FIG. 2. FIG. 6 is a schematic enlarged view of region B of the coil component of FIG. 5. Referring to FIGS. 5 and 6, the coil part 70 may similarly include the supporting member 20, the first coil conductor 31 disposed on a first surface of the supporting member 20 and having a first conductor pattern of a planar coil shape, the second coil conductor 41 disposed on a second surface of the supporting member 20 opposing the first surface thereof and having a second conductor pattern of a planar coil shape, the first insulator 33 filling a space between the first conductor patterns and covering outer surfaces of the first conductor pattern, the second insulator 43 filling a space between the second conductor patterns and covering outer surfaces of the second conductor pattern, and the through via 51 penetrating through the supporting member 20 and connecting the first and second coil conductors 31 and 41 to each other. However, the first insulator 33 may be formed of the same material, that is, the material forming the first insulating film 33. Further, the second insulator 43 may be formed of the same material, that is, the material forming the second insulating film 43. Hereinafter, a description of contents overlapping those described above will be omitted, and a difference will be described in more detail.

Since the first resist 32*a* and the third resist 42*a* forming the first insulating wall 32 and the second insulating wall 42, respectively, may be selectively stripped by the stripping liquid, the first insulating wall 32 and the second insulating wall 42 may all be removed during a process of forming the coil component in some cases. In this case, spaces from which the first insulating wall 32 and the second insulating wall 42 are removed may be filled during a process of forming the first insulating film 33 and the second insulating film 43. That is, the first insulator 33 may be formed of the same material, that is, the material forming the first insulating film 33. Further, the second insulator 43 may be formed of the same material, that is, the material forming the second insulating film 43. Further, since the first insulating film 33 and the second insulating film 43 may also be simultaneously formed, the first insulating film 33 and the second insulating film 43 may be formed of the same material. Even in this case, the contents of the conductor pattern, the aspect ratio of the insulator filling the space between the conductor patterns, and the like may be all equally applied. That is, other contents are the same as those described above.

Figure 7:
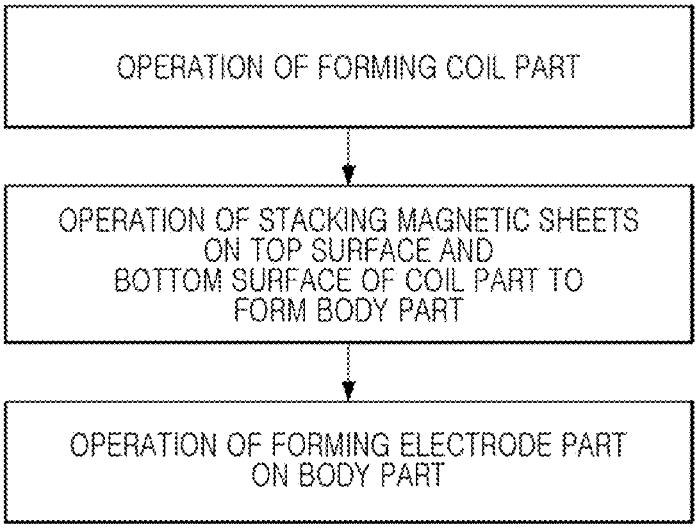
FIG. 7 illustrates an exemplary embodiment of a schematic process flowchart of the coil component of FIG. 2.

FIG. 7 illustrates an exemplary embodiment of a schematic process flowchart for forming the coil component of FIG. 2. Referring to FIG. 7, the coil component 100 according to an exemplary embodiment may be manufactured by forming the coil part 70, stacking magnetic sheets on a top surface and a bottom surface of the formed coil part 70 to form the body part 10, and then forming the electrode part 80 on the formed body part 10. In this case, a plurality of coil components 100 may be manufactured by a single process. For example, the plurality of coil components may be formed by forming coil conductors on the supporting member having a wide area to form a plurality of coil parts, removing unnecessary portions of the supporting member using a trimming method, stacking magnetic sheets on top surfaces and bottom surfaces of the plurality of coil parts to form a plurality of body parts, cutting the plurality of body parts to form a large amount of body parts, and then finally forming an electrode part on each of the body parts.

Figure 8A:
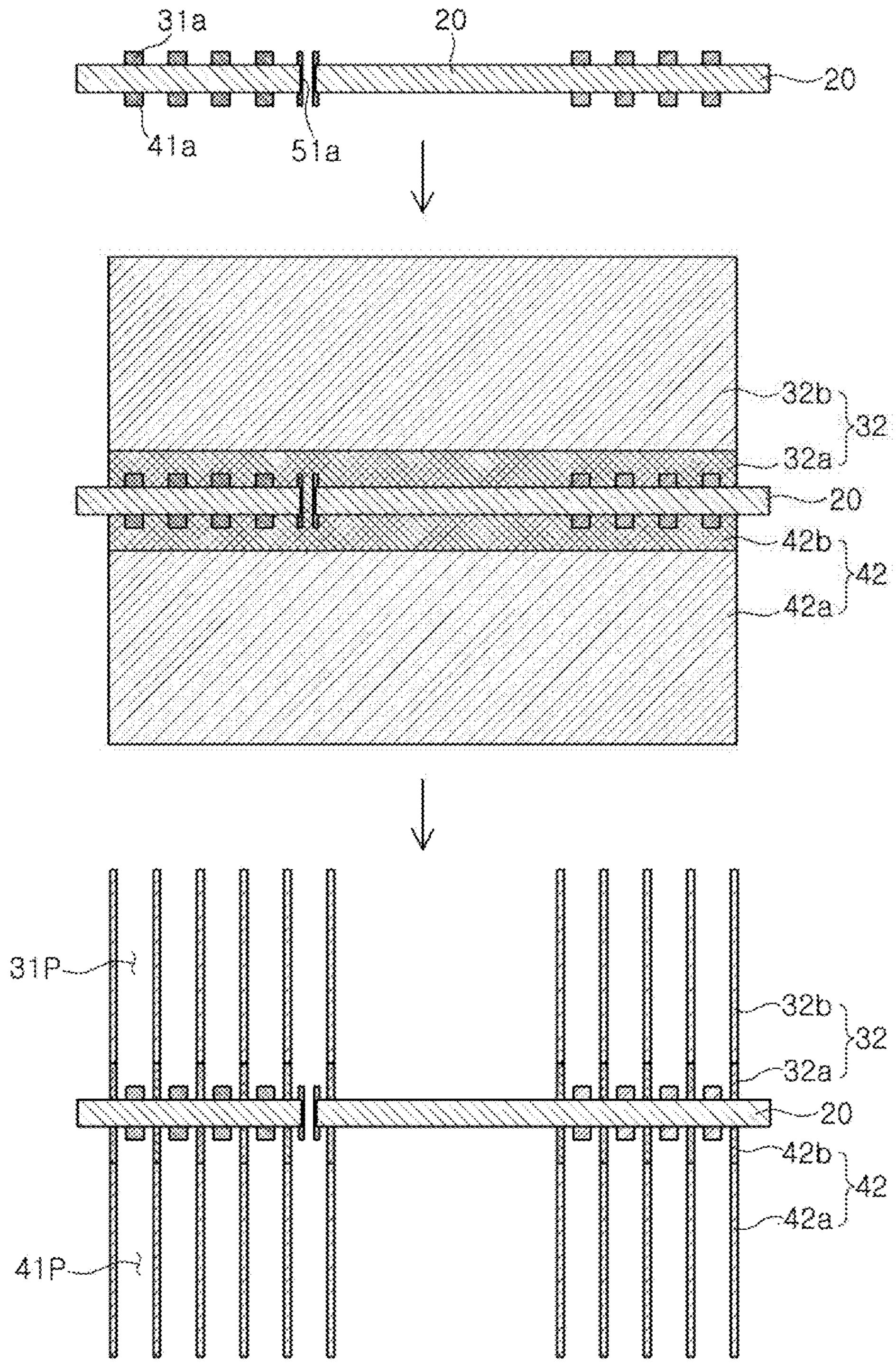
FIGS. 8A through 8C illustrate an exemplary embodiment of a schematic process of the coil component of FIG. 2.
Figure 8B:
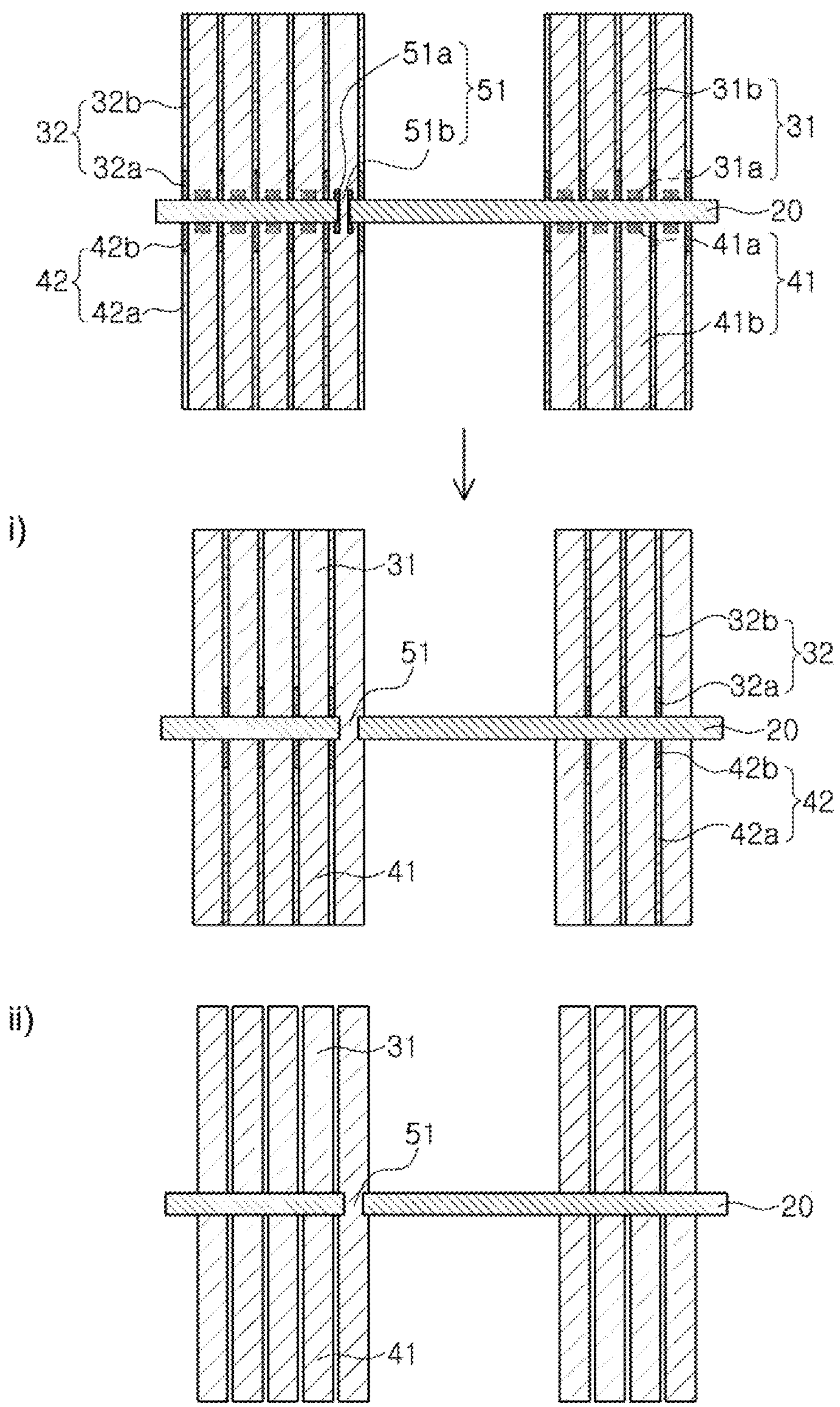
Figure 8C:
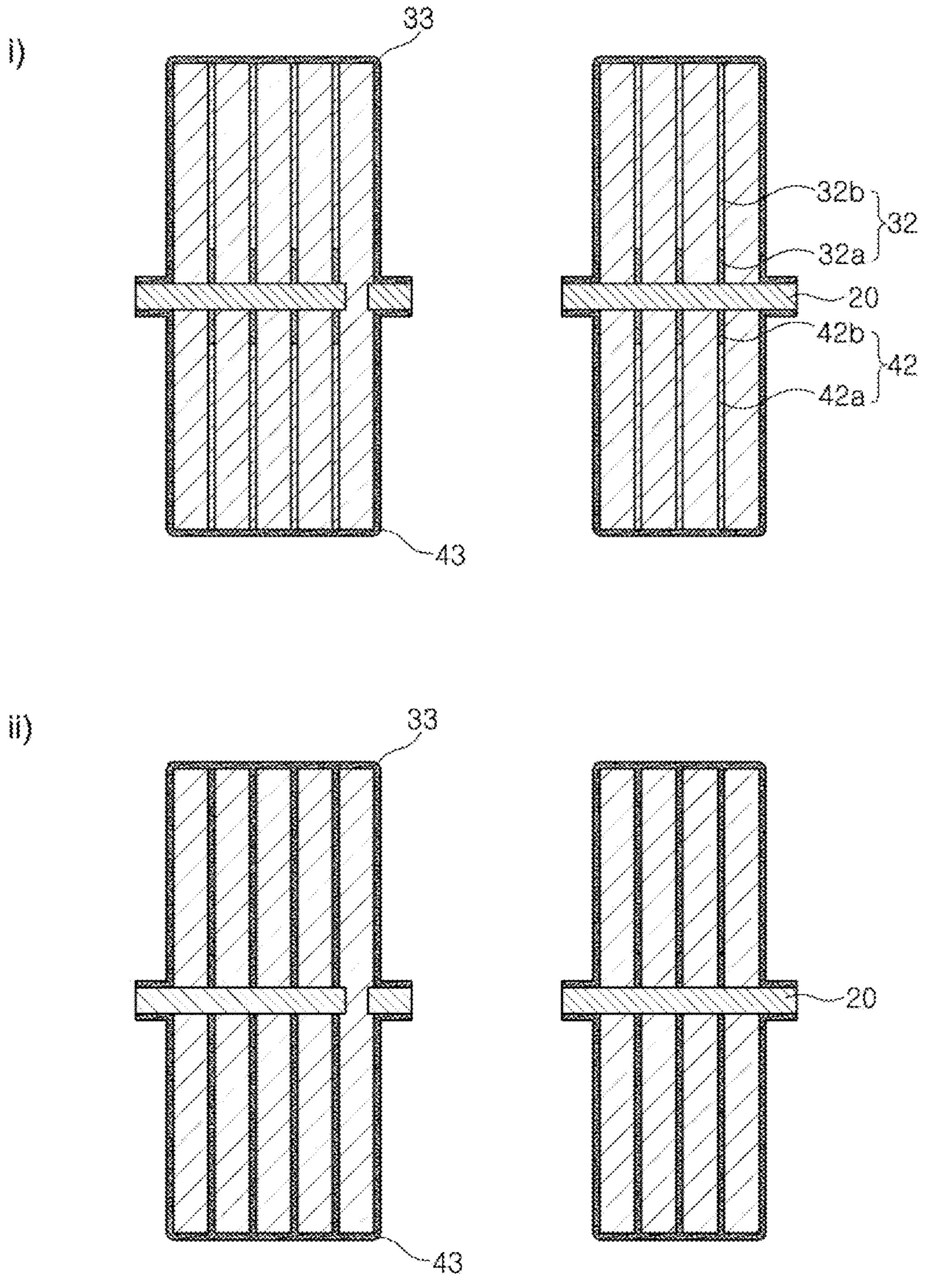

FIGS. 8A through 8C illustrate an exemplary embodiment of a schematic process of forming the coil component of FIG. 2. Specifically, FIGS. 8A through 8C schematically illustrate an exemplary embodiment of a process of forming the coil part 70 of the coil component 100. Hereinafter, a description of contents overlapping those described above will be omitted, and the respective operations of the process of forming the coil part 70 of the coil component 100 will be described in more detail with reference to the accompanying drawings.

Referring to FIG. 8A, first, the first seed layer 31*a* and the second seed layer 41*a* may be formed on respective surfaces of the supporting member 20. Further, after a hole penetrating through the supporting member 20 is formed, the via seed layer 51 may also be formed. The first seed layer 31*a* and the second seed layer 41*a* may each have a conductor pattern of a planar coil shape. The above-mentioned seed layers may be formed by a known method, and may be formed by, for example, a chemical vapor deposition (CVD) method, a physical vapor deposition (PVD) method, a sputtering method, and the like using a dry film, but are not limited thereto. Meanwhile, the hole may be formed by using laser and/or mechanical drill machining before plating.

Next, referring to FIG. 8A, the first resist 32*a* and the third resist 42*a* may be respectively formed on first and second surfaces of the supporting member 20. Further, the second resist 32*b* and the fourth resist 42*b* may be respectively formed on the first resist 32*a* and the third resist 42*a*. The above-mentioned resists may be formed by a known method, and may be formed by, for example, a method of laminating and then curing the resists, an application and curing method, and the like, but are not limited thereto. As the method of laminating the resists, for example, a method of separating a working tool by cooling the resists in a cold press after a hot press in which the resists are compressed for a predetermined time at a high temperature and are then decompressed to be cooled to room temperature may be used. As the application method, for example, a screen printing method in which ink is applied with a squeegee, a spray printing method in which the ink is misted and applied, and the like may be used. The curing may mean that the resists are dried so as not to be fully cured in order to use a photolithography method, or the like as a post process.

Referring to FIG. 8A, the first and second resists 32*a* and 32*b* and the third and fourth resists 42*a* and 42*b* may each be patterned. As a result of the patterning, first and second opening patterns 31P and 41P having a planar coil shape may be formed. Further, first and second insulating walls 32 and 42 may be formed. The first and second seed layers 31*a* and 41*a* may be opened by the first and second opening patterns 31P and 41P. The patterning may be performed by using a known photolithography method, that is, a known exposure and development method, and the patterning may also be sequentially performed, or may also be performed at one time. An exposure machine or a developing solution is not particularly limited, and may be appropriately selected and used depending on a used photosensitive material.

Next, referring to FIG. 8B, the first and second opening patterns 31P and 41P may be utilized as a plating growth guide, thereby forming the first and second plating layers 31*b* and 41*b*, respectively. As such, since the opening patterns are first formed in the insulator and are then utilized as the guide to perform the plating, there is an advantage that the shape of the coil conductor may be easily adjusted unlike an anisotropic plating technology. That is, the first and second conductor patterns which are formed may have flat side surfaces which are in contact with the first and second insulating walls 32 and 42. Here, the word "flat" is a concept including both a case in which any component is substantially flat and a case in which any component is fully flat. That is, it is considered that wall surfaces of the opening patterns are partially uneven by a photolithography method. A plating method is not particularly limited, and electroplating, electroless plating, or the like using a dry film may be used, but the plating method is not limited thereto.

Referring to FIG. 8B, the first and second insulating walls 32 and 42 may be selectively removed. Since the first and third resists 32*a* and 42*a* of the first and second insulating walls 32 and 42 may be selectively stripped by the stripping liquid, only the first and second insulating walls 32 and 42 disposed on outer portions may also be stripped as illustrated in i) of FIG. 8B, and all of the first and second insulating walls 32 and 42 may also be stripped as illustrated in ii) of FIG. 8B. An example of a usable stripping liquid may include a remover PG (NMP), or the like, but is not limited thereto. For example, the usable stripping liquid may be different depending on a material of the used resist.

Next, referring to FIG. 8C, the coil part may be formed by a through hole machining and an insulating film coating. For the through hole machining, laser and/or mechanical drill machining may be used. For the insulating film coating, a chemical vapor deposition (CVD) method, or the like may be used. As illustrated in the drawings, the insulating film coating may also be first performed. Unlike this, the through hole machining may also be first performed. In the case in which the through hole machining is first performed, all of the insulating films may be connected. As a result of the insulating film coating, the first and second insulating films 33 and 43 may be formed. In this case, depending on a stripping degree of the first and second insulating walls 32 and 42, the first and second insulating films 33 and 43 may cover the outer surfaces of the first and second conductor patterns as illustrated in i) of FIG. 8C, and may also fill a space between the first and second conductor patterns as illustrated in ii) of FIG. 8C. The first and second conductor patterns may have flat top surfaces which are in contact with the first and second insulating films 33 and 43. Therefore, the first and second conductor patterns may have more uniform resolution.

Figure 9:
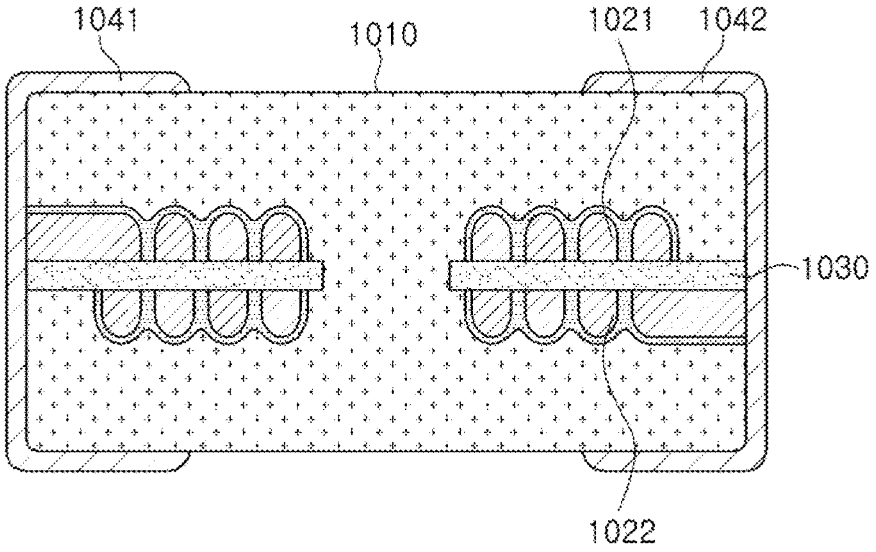
FIG. 9 is a cross-sectional view schematically illustrating an exemplary embodiment of a coil component manufactured by isotropic plating technology.

FIG. 9 schematically illustrates an exemplary embodiment of a coil component to which an isotropic plating technology is applied. The coil component to which the isotropic plating technology is applied may be manufactured by, for example, forming plating patterns 1021 and 1022 of a planar coil shape on both surfaces of a supporting member 1030 by the isotropic plating technology, embedding the plating patterns 1021 and 1022 using a magnetic material to form a body 1010, and then forming external electrodes 1041 and 1042 electrically connected to the plating patterns 1021 and 1022 on outer surfaces of the body 1010. However, according to the isotropic plating technology, since a growth of the plating patterns in a thickness direction thereof and a growth of the plating patterns in a width direction thereof are simultaneously performed as plating is performed when an electroplating method is performed, there is a limit in implementing a high aspect ratio as illustrated in FIG. 9.

Figure 10:
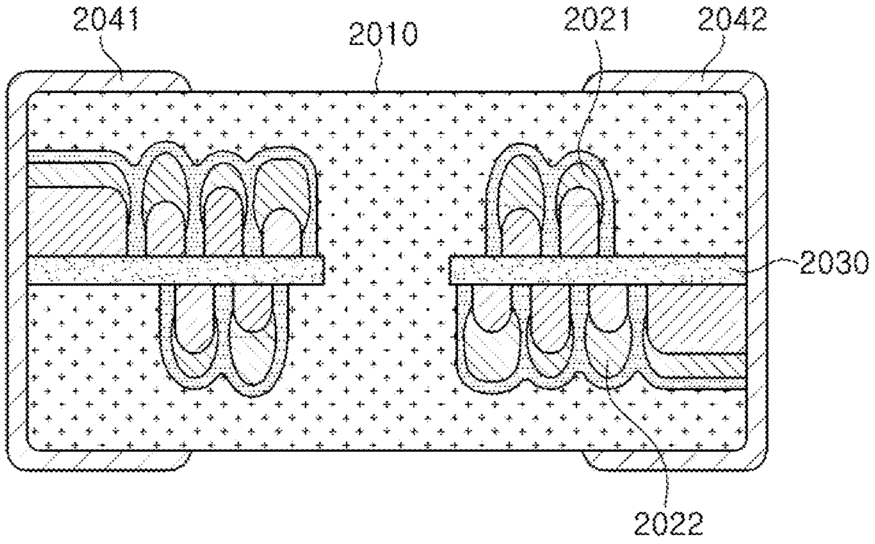
FIG. 10 is a cross-sectional view schematically illustrating an exemplary embodiment of a coil component manufactured by anisotropic plating technology.

FIG. 10 schematically illustrates an exemplary embodiment of a coil component to which an anisotropic plating technology is applied. The coil component to which the anisotropic plating technology is applied may be manufactured by, for example, forming plating patterns 2021 and 2022 of a planar coil shape on both surfaces of a supporting member 2030 by the anisotropic plating technology, embedding the plating patterns 2021 and 2022 using a magnetic material to form a body 2010, and then forming external electrodes 2041 and 2042 electrically connected to the plating patterns 2021 and 2022 on outer surfaces of the body 2010. However, in the case in which the anisotropic plating technology is applied, the high aspect ratio may be implemented, but uniformity of a plating growth may be deteriorated according to an increase in the aspect ratio, and since a distribution of a plating thickness is wide, short circuits between the plating patterns may still easily occur.

Conversely, in a case in which the coil conductors are formed by utilizing the insulating films which may be selectively stripped and have the high aspect ratio as the plating guide as in the coil component 100 according to an exemplary embodiment, since the height and the width of the plating patterns may be freely adjusted within a distribution allowed by a processing technology of forming a pattern, uniformity of the plating patterns may be excellent, and low direct current resistance $R_{dc}$ characteristics may be implemented according to the high aspect ratio. Further, an area of a magnetic region may be sufficiently expanded, and the occurrence of short circuits between the plating patterns may also be reduced. Further, an affect which may occur from the resists may be significantly reduced. Further, in some cases, the insulators having magnetic properties may be provided in the spaces from which the insulating walls are removed, thereby also improving performance of the coil component.

As set forth above, according to the exemplary embodiments in the present disclosure, the coil component of the new structure capable of securing uniformity of the coil and the low direct current resistance $R_{dc}$ while having the low risk of defects such as the occurrence of short circuits, or the like, may be provided.

In the present specification, a word "electrically connected" is a concept including both a case in which any component is physically connected to another component and a case in which any component is not necessarily physically connected to another component. In addition, terms “first”, “second”, and the like, are used to distinguish one component from another component, and do not limit a sequence, importance, and the like, of the corresponding components. In some cases, a first component may be named a second component and a second component may also be similarly named a first component, without departing from the scope of the present disclosure.

In addition, the terms ‘example’ or ‘exemplary embodiment’ used in the present disclosure do not mean the same example or exemplary embodiment, but are provided in order to emphasize and describe different unique features. However, the above suggested examples and exemplary embodiments may be implemented to be combined with a feature of another example or exemplary embodiment. For example, even though particulars described in a specific example or exemplary embodiment are not described in another example or exemplary embodiment, it may be understood as a description related to another example or exemplary embodiment unless described otherwise.

In addition, terms used in the present disclosure are used only in order to describe an example rather than limiting the scope of the present disclosure. Here, singular forms include plural forms unless interpreted otherwise in a context.

While exemplary embodiments have been shown and described above, it will be apparent to those skilled in the art that modifications and variations could be made without departing from the scope of the present invention as defined by the appended claims.

What is claimed is:

1. A coil component comprising:
a body part including a magnetic material;
a coil part disposed in the body part; and
an electrode part disposed on the body part,
wherein the coil part includes:
a supporting member,
a coil conductor disposed on at least one surface of the supporting member and having a conductor pattern of a planar coil shape, and
an insulator including an insulating wall filling a space surrounded by the conductor pattern, and an insulating film covering outer surfaces of the conductor pattern and the insulating wall,
wherein H1/W1 is between 3 and 9, where H1 is a height of the conductor pattern and W1 is a width of the conductor pattern,
wherein the insulating wall and the insulating film have an interface therebetween,
wherein the conductor pattern has a top surface which is in contact with the insulating film, and
wherein the insulating film includes a portion covering an innermost or outermost side surface of the conductor pattern, said portion including a material different than a material of the insulating wall.

2. The coil component of claim 1, wherein
H2/W2 is between 10 and 25, where H2 is a height of the insulating wall and W2 is a width of the insulating wall.

3. The coil component of claim 2, wherein the conductor pattern has a side surface which is in contact with the insulating wall.

4. The coil component of claim 1, wherein
the insulating wall and the insulating film include different materials.

5. The coil component of claim 4, wherein the insulating wall includes a first resist and a second resist,
the first resist is disposed on at least one surface of the supporting member,
the second resist is disposed on the first resist, and
the first and second resists include different materials.

6. The coil component of claim 5, wherein the first resist includes a photosensitive material including a cyclic ketone compound and an ether compound having a hydroxyl group.

7. The coil component of claim 5, wherein the second resist includes a photosensitive material including a bisphenol epoxy resin.

8. The coil component of claim 5, wherein a height of the second resist is higher than a height of the first resist.

9. The coil component of claim 1, wherein the insulating wall and the insulating film include same materials.

10. The coil component of claim 1, wherein the conductor pattern includes a plurality of turns, the insulating wall is formed in plural,
the insulating walls fill spaces between adjacent turns of the plurality of turns, respectively, and
the insulating film covers top surfaces of the plurality of turns of the conductor pattern, top surfaces of the plurality of insulating walls, a side surface of an innermost turn of the conductor pattern, and a side surface of an outermost turn of the conductor pattern.

11. The coil component of claim 1, wherein the conductor pattern includes
a seed layer disposed on a surface of the supporting member, and
a plating layer formed on the seed layer.

12. The coil component of claim 1, wherein the supporting member includes a glass fiber and an insulating resin.

13. The coil component of claim 1, wherein the coil part includes
the supporting member,
a first coil conductor disposed on a first surface of the supporting member and having a first conductor pattern of a planar coil shape,
a second coil conductor disposed on a second surface of the supporting member opposing the first surface thereof and having a second conductor pattern of a planar coil shape,
a first insulator including a first insulating wall filling a space surrounded by the first conductor pattern and, a first insulating film covering outer surfaces of the first conductor pattern and the first insulating wall, and
a second insulator including a second insulating wall filling a space surrounded by the second conductor pattern and, a second insulating film covering outer surfaces of the second conductor pattern and the second insulating wall, and
H11/W11 is between 3 to 9, where H11 is a height of the first conductor pattern and W11 is a width of the first conductor pattern, and
H12/W12 is between 3 to 9, where H12 is a height of the second conductor pattern and W12 is a width of the second conductor pattern.

14. The coil component of claim 13, wherein the coil part further includes a through via penetrating through the supporting member and connecting the first and second coil conductors.

15. A coil component comprising:
a body part including a magnetic material;
a coil part disposed in the body part; and
an electrode part disposed on the body part,
wherein the coil part includes:
a supporting member, a coil conductor disposed on at least one surface of the supporting member and having a conductor pattern of a planar coil shape, and an insulator including an insulating wall filling a space surrounded by the conductor pattern, and an insulating film covering outer surfaces of the conductor pattern and the insulating wall, wherein H1/W1 is between 3 and 9, where H1 is a height of the conductor pattern and W1 is a width of the conductor pattern, wherein the insulating film is a single layer that covers outer surfaces of the conductor pattern and the insulating wall, and wherein the insulating film includes a portion covering an innermost or outermost side surface of the conductor pattern, said portion including a material different than a material of the insulating wall.

* * * * *